(12) United States Patent
Gurreri et al.

(10) Patent No.: US 7,553,089 B2
(45) Date of Patent: Jun. 30, 2009

(54) CONNECTOR FOR JACKETED OPTICAL FIBER CABLE

(75) Inventors: Michael Lawrence Gurreri, York, PA (US); Douglas Harold Rohde, York, PA (US); Eric James Hopkins, Liverpool, PA (US); David Donald Erdman, Hummelstown, PA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 11/818,812

(22) Filed: Jun. 15, 2007

(65) Prior Publication Data

US 2007/0292084 A1    Dec. 20, 2007

Related U.S. Application Data

(60) Provisional application No. 60/814,276, filed on Jun. 15, 2006.

(51) Int. Cl.
*G02B 6/36* (2006.01)
*G02B 6/38* (2006.01)

(52) U.S. Cl. .............................. 385/78; 385/60; 385/77; 385/81

(58) Field of Classification Search .................. 385/60, 385/77, 78, 81, 139
See application file for complete search history.

(56) References Cited

U.S. PATENT DOCUMENTS

| | | | | |
|---|---|---|---|---|
| 5,633,970 A * | 5/1997 | Olson et al. | .................... | 385/78 |
| 5,809,192 A * | 9/1998 | Manning et al. | ............... | 385/78 |
| 6,318,903 B1 * | 11/2001 | Andrews et al. | ............... | 385/77 |
| 6,464,402 B1 * | 10/2002 | Andrews et al. | ............... | 385/53 |
| 6,652,156 B2 * | 11/2003 | Shinagawa et al. | ............ | 385/78 |
| 7,147,384 B2 * | 12/2006 | Hardcastle et al. | ............ | 385/60 |
| 7,346,256 B2 * | 3/2008 | Marrs et al. | .................. | 385/137 |
| 2002/0085815 A1 | 7/2002 | Shinagawa et al. | | |
| 2003/0161586 A1 | 8/2003 | Hirabayashi | | |

FOREIGN PATENT DOCUMENTS

| | | |
|---|---|---|
| EP | 1 067 415 | 1/2001 |
| EP | 1 072 914 | 1/2001 |
| JP | 57 74714 | 5/1982 |
| WO | WO 2004/107002 | 12/2004 |

OTHER PUBLICATIONS

International Search Report, International application No. PCT/US2007/013916, International filing date Jun. 14, 2007.

* cited by examiner

*Primary Examiner*—Sung H Pak
*Assistant Examiner*—Daniel Petkovsek

(57) ABSTRACT

An optical connector which is suitable for connection to jacketed cable includes a housing and a ferrule assembly. The ferrule assembly includes a front portion having a first geometry, and the housing includes a receiving portion having a second geometry that mates with the first geometry to prevent rotation of the ferrule assembly relative to the housing. A spring biases the ferrule assembly forward to assist mating of the first and second geometries.

10 Claims, 3 Drawing Sheets

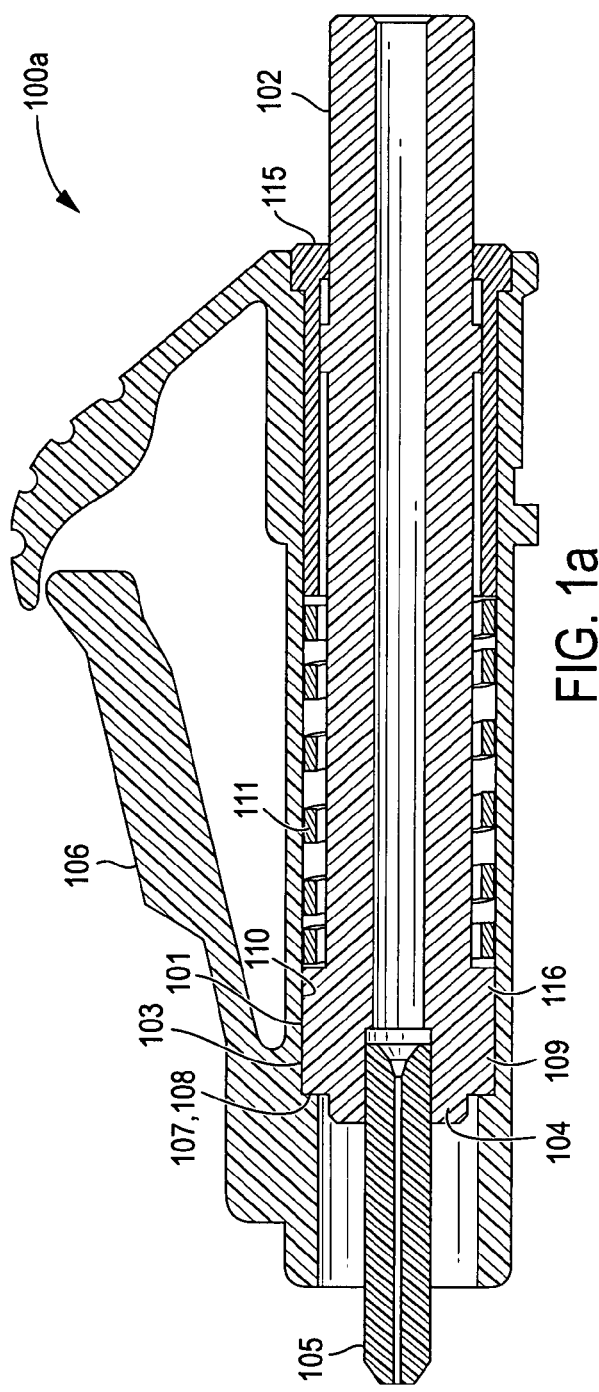
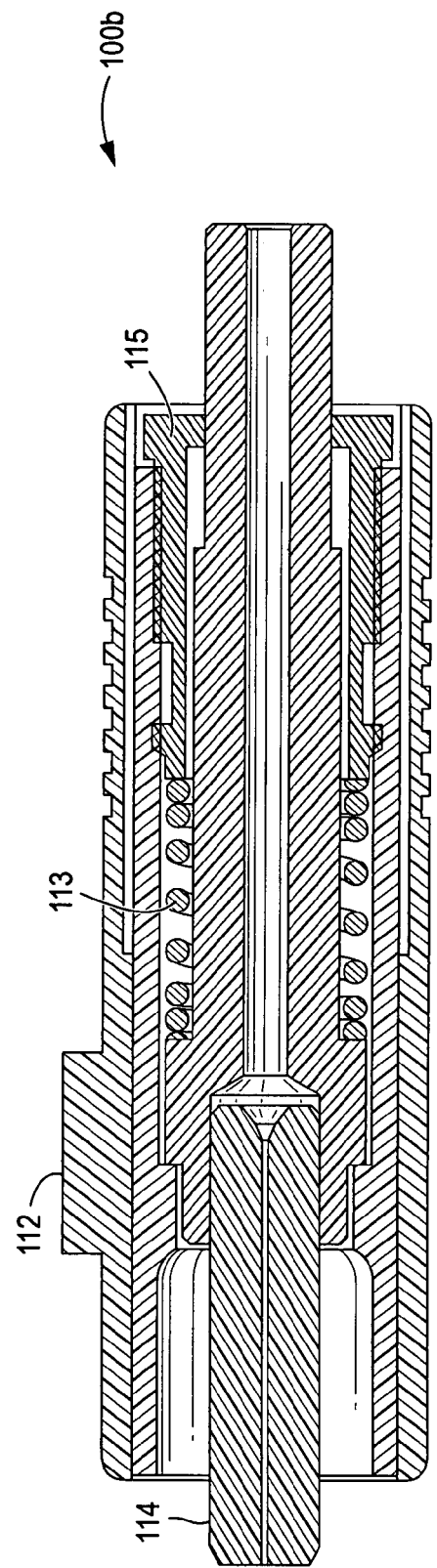
FIG. 1a
FIG. 1b

CONNECTOR FOR JACKETED OPTICAL FIBER CABLE

CROSS-REFERENCE TO RELATED APPLICATIONS

This application claims the benefit of U.S. Provisional Application No. 60/814,276 filed Jun. 15, 2006.

FIELD OF INVENTION

The present invention relates generally to an optical connector and, more specifically, to a connector suitable for termination to a jacketed optical fiber cable.

BACKGROUND OF INVENTION

Jacketed optical fiber cable (herein jacketed cable) is well known and comprises an optical fiber adhered to a surrounding tough polymer jacket. Unlike typical buffered cable, the fiber in a jacketed cable is not free to move within its protective covering. Jacketed cable is generally recognized as having superior crush resistance and possibly a broader operating temperature range than other optical fiber cables.

Jacketed cable has been used historically in naval and other military applications. Typically, these cables were connectorized with ST bayonet-type connectors. These are relatively old-style connectors having a large form factor and a screw-type connection mechanism. In the ordinary course of retrofitting this equipment, it would be desirable to replace these old fashioned connectors with more modern small form factor connectors such as the LC and MU connectors. Although it is desirable to change the connector interface, it is undesirable to run entirely new fiber throughout the vessel.

Furthermore, applicants have discovered that connectors, particularly small form factor connectors, are susceptible to torsional rotation of the cable relative to the housing. Specifically, because there is no "give" between the jacket and the fiber within the jacket, any torsional motion on the jacket will necessarily create a torsion force on the ferrule assembly. If this torsional force is high enough, it can cause the connector housing to deform and allow the ferrule assembly to rotate within. This rotation diminishes the quality of optical interface and may even damage the connector if the rotation is severe. Therefore, preventing the ferrule assembly from rotating within the housing is critical in the use of a tight jacketed fiber cable.

Applicants have found that small form factor connectors are far more susceptible to this torsional rotation than their larger predecessors. Without being bound to any theory for this susceptibility, applicants believe that the small radius connectors lack the torsional rigidity of their larger predecessors. For example, a typical LC connector comprises a housing defining an octagonal cavity and a ferrule assembly having an octagonal outer geometry which fits into the cavity. The corners of the octagonal interconnection, however, are insufficient to resist the rotational forces common on jacketed cables.

Thus, there is a need for a small form factor optical connector that can be terminated to an existing jacketed optical fiber cable and that is resistant to deformation when a torsional force is applied to the cable jacket.

SUMMARY OF INVENTION

One aspect of the invention is a connector having a ferrule assembly which is suitable for connection to jacketed cable and which is prevented from rotating within its housing. In a preferred embodiment, the connector comprises (a) a ferrule assembly comprising a rear portion for attachment to a jacket of a jacketed fiber, a front portion having a first geometry, and a ferrule suitable for containing at least one fiber of the jacketed fiber extending forward from the front portion; (b) a housing having a receiving portion comprising a second geometry for mating with the first geometry to prevent rotation of the ferrule assembly relative to the housing, wherein one of the first geometry and the second geometry comprises radially extending ridges, and the other of the first geometry and the second geometry comprises radially extending recesses for receiving the ridges; and (c) a spring biasing the ferrule assembly forward such that the radially extending ridges are received within the radially extending recesses to mate the first and second geometries.

Accordingly, the connector of the present invention is configured to have an internal geometry involving the interconnection of radially extending ridges. The radially extending ridges protrude to such an extent that the housing is unable to deform sufficiently to accommodate the protrusion and allow rotation of the ferrule assembly.

This configuration is not only robust and resistant to rotational movement, but also facilitates alignment and/or tuning in contrast to prior art jacketed connectors. That is, a conventional ST connector allowed the ferrule assembly to rotate freely within the housing prior to being mated with an adapted. The ferrule assembly of the present invention, however, is held in a particular radial position relative to the housing even before it is mated. Such a configuration is essential to asymmetrically polished connectors or polarization maintaining connectors. Furthermore, depending on the number and spacing of the radial ridges, the ferrule assembly can be rotated in predetermined radial increments to tune the connector. Therefore, the connector of the present invention not only facilitates the use of small form factor connectors in jacketed cable applications, but also offers radial alignment and tuning features in contrast to the prior art.

BRIEF DESCRIPTION OF DRAWINGS

FIGS. 1a and 1b show preferred embodiments of the connector of the present invention.

DETAILED DESCRIPTION OF A PREFERRED EMBODIMENT

Figure 2:
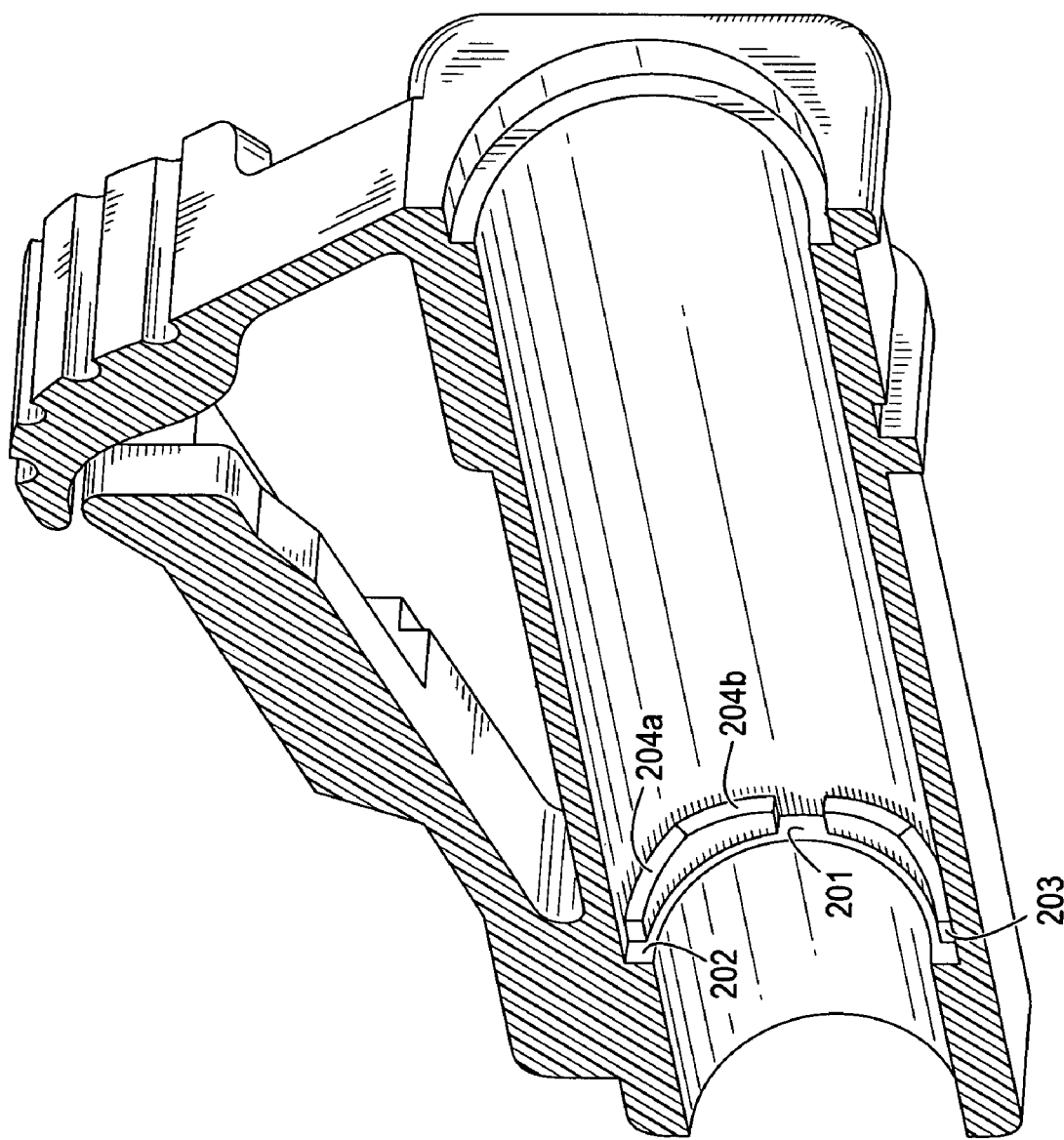
FIG. 2 shows a perspective view of a cross sectioned of the housing of the connector shown in FIG. 1.

Referring to FIGS. 1a and 1b, connectors 100a, 100b of the present invention are shown. First, with respect to FIG. 1a, the connector 100a comprises a ferrule assembly 101 comprising a rear portion 102 for attachment to a jacket of a jacketed fiber (not shown) and a front portion 103 having a first geometry 104, and a ferrule 105 extending forward from the front portion 103 and suitable for containing at least one fiber (not shown) of the jacketed fiber. The connector also comprises a housing 106 having a receiving portion 107 comprising a second geometry 108 for mating with the first geometry 104 to prevent rotation of the ferrule assembly 101 relative to the housing 106. In this embodiment, the first geometry comprises radially extending ridges 109 and the second geometry comprises radially extending recesses 110 for receiving the ridges. It should be understood, however that this configuration can be reversed and that the second geometry could comprise the radially extending ridges and the first geometry could comprise the recesses. The connector 100a also comprises a spring 111 for biasing the ferrule assembly forward such that the radially extending ridges are received within the recesses to mate the first and second geometries.

FIG. 1a shows the invention embodied in a typical LC type connector. In this particular embodiment, the spring 111 is a square spring such that an integrally molded housing 106 can be used. It should be understood that other embodiments of not only the LC-type connector, but also of small form factor connectors in general, are well within the scope of this invention. FIG. 1b shows the invention embodied in a standard, or non-small form factor design, connector. Specifically, this is an SC type connector in which the housing 112 and ferrule 114 are significantly larger than those of a small form factor design. Due to the increased size, this embodiment allows for the use of a round spring 113 as shown. In both embodiments, it is worth while to mention that the spring uses a rear insertion body 115 as a back stop to urge the ferrule assembly forward in the housing.

It should be understood that the present invention can be practiced using any standard connector configuration including, for example, LC, MU, SC, ST, and FC. The design features of such connectors such as their outside housing geometries, latching mechanisms, and ferrule biasing are well known and will not be specifically addressed herein.

Referring to FIG. 2, the second geometry of the housing 102 is considered in greater detail. Specifically, in a preferred embodiment, the second geometry comprises recesses 201 on a rear facing surface 202. In a preferred embodiment, the recesses are defined by wall segments 203 which have cam surfaces 204a, 204b. Specifically, each wall segment 203 separates two recesses 201. At approximately the middle point of the wall segment between the two recesses, one cam surface 204a slants toward one recess on one side of the wall segment, while the other cam surface 204b slopes toward the other recess on the other side. This way, if a radial extending ridge contacts the wall surface rather than a recess, the cam surfaces 204a and 204b will direct the radially extending ridges to the closest recess.

Such an embodiment is particularly beneficial in a non-pull proof connector since it is likely that, if the cable is pulled, the ferrule assembly will move rearward and away from the receiving portion of the housing. This will allow the ferrule assembly to rotate relative to the housing. Once the pulling force on the jacketing cable is relaxed, the ferrule assembly will return to the forward receiving portion of the housing 102 by virtue of the spring biasing it forward. To the extent that there has been any rotational movement and resulting misalignment between the ridges and the recesses, the cam surfaces will guide the radially extending ridges to a recess to thereby seat the ferrule assembly in the housing.

Figure 3B:
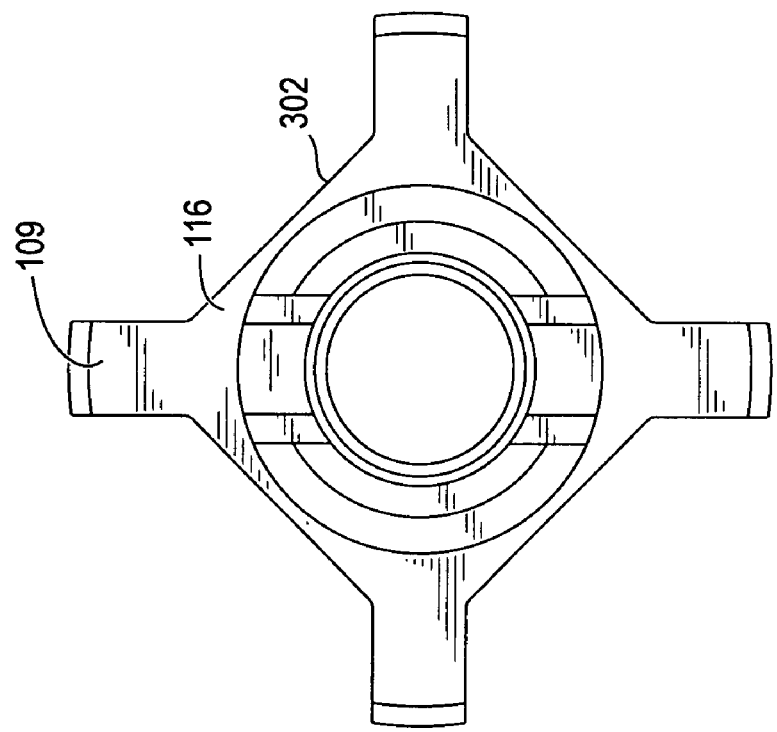
FIGS. 3a and 3b show alternative embodiments of the first geometry of the ferrule assembly of the present invention.
Figure 3A:
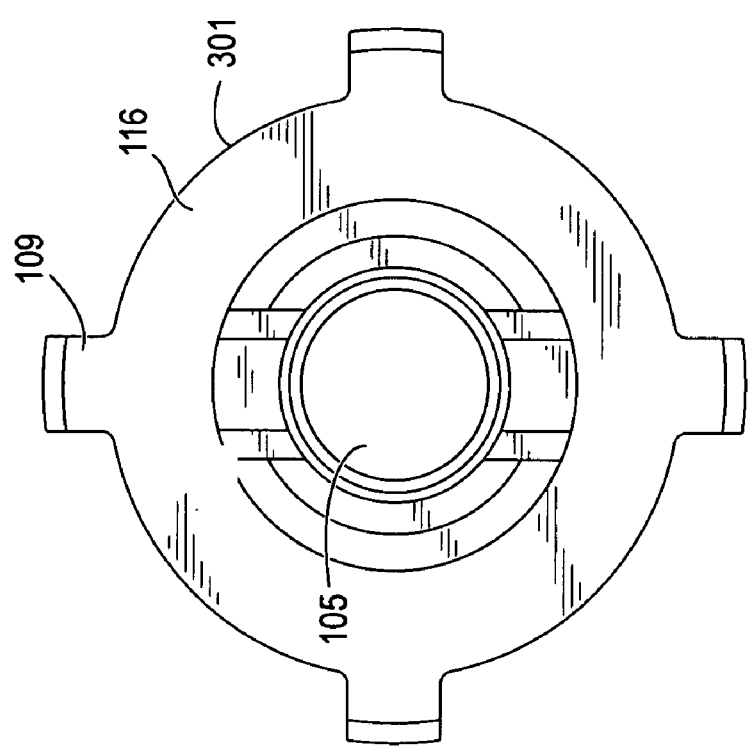

Referring to FIGS. 3a and 3b, front views of alternative embodiments of the first geometry are shown. In a preferred embodiment, the ferrule assembly comprises a collar 116 at the front portion 103. FIG. 3a shows a collar having four radially extending ridges in which curved surfaces 301 extend between the radially extending ridges. In contrast, FIG. 3b shows an embodiment in which straight surfaces 302 extend between the radially extending ridges. In both cases, the radially extending ridges form a plus sign. A plus sign embodiment is preferred as it allows the ferrule assembly 101 to be oriented at 90 degree increments with respect to the housing. Generally, 90 degree increments have been found to be preferable from the standpoint of tuning the ferrule assembly relative to the housing. It should be understood, however, that in addition to these embodiments, many other embodiments of the first and second geometries are possible and within the scope of this invention. For example, there could be many more than four extending ridges. Such embodiments might be preferred if less than a 90 degree rotational increment is desired. Furthermore, as mentioned above, rather than the first geometry comprising the radially extending ridges, the first geometry could define the recesses to receiving the radially extending ridges of the housing. Still other embodiments will be apparent to one of skill in the art in light of this specification.

What is claimed is:

1. A connector comprising:
  a ferrule assembly comprising a rear portion for attachment to a jacket of a jacketed fiber, a front portion having a first geometry, and a ferrule defining a bore hole for containing at least one fiber of said jacketed fiber extending forward from said front portion;
  a small form factor housing having a receiving portion comprising a second geometry for mating with said first geometry to prevent rotation of said ferrule assembly relative to said housing, wherein either first or second geometry comprises radially extending members and the other comprises radially extending recesses for receiving said members;
  a spring biasing said ferrule assembly forward such that said radially extending members are received within said recesses to mate said first and second geometries; and
  said jacketed cable, said jacket of said jacket cable being connected to the rear portion of said ferrule assembly.

2. The connector of claim 1, wherein said first geometry comprises said members and said second geometry comprises said recesses.

3. The connector of claim 2, wherein said ferrule assembly comprises an annular collar on said front portion and said members comprise ridges extending radially from said collar and said recesses are defined in a rear-facing surface of the receiving portion.

4. The connector of claim 3, wherein said members and said recess having camming surfaces such that, as said ferrule assembly is moved forwardly to said receiving portion in one radial orientation, said members and said recesses contact on said camming surfaces causing said ferrule assembly to rotate relative to the housing to a second radial orientation such that said first and second geometries mate.

5. The connector of claim 1, wherein said members total four and form a plus sign on said collar.

6. The connector of claim 1, wherein said connector is selected from the group consisting of LC and MU.

7. The connector of claim 1, wherein said housing is a single, integrally molded piece.

8. The connector of claim 1, further comprising a rear body which is adapted to press fit within the rear of said housing and provide a back stop for said spring.

9. The connector of claim 1, wherein said rear-facing surface is spaced sufficiently from said rear insertion body to allow said ferrule assembly to be pulled rearwardly such that said first geometry disengages from said second geometry, thereby allowing said ferrule assembly to rotate in said housing.

10. The connector of claim 9, further comprising said jacketed cable, said jacket of said jacketed cable being connected to the rear portion of said ferrule assembly.

* * * * *